July 29, 1958  G. LANGE  2,844,997
PHOTOGRAPHIC OBJECTIVE
Filed Nov. 26, 1956
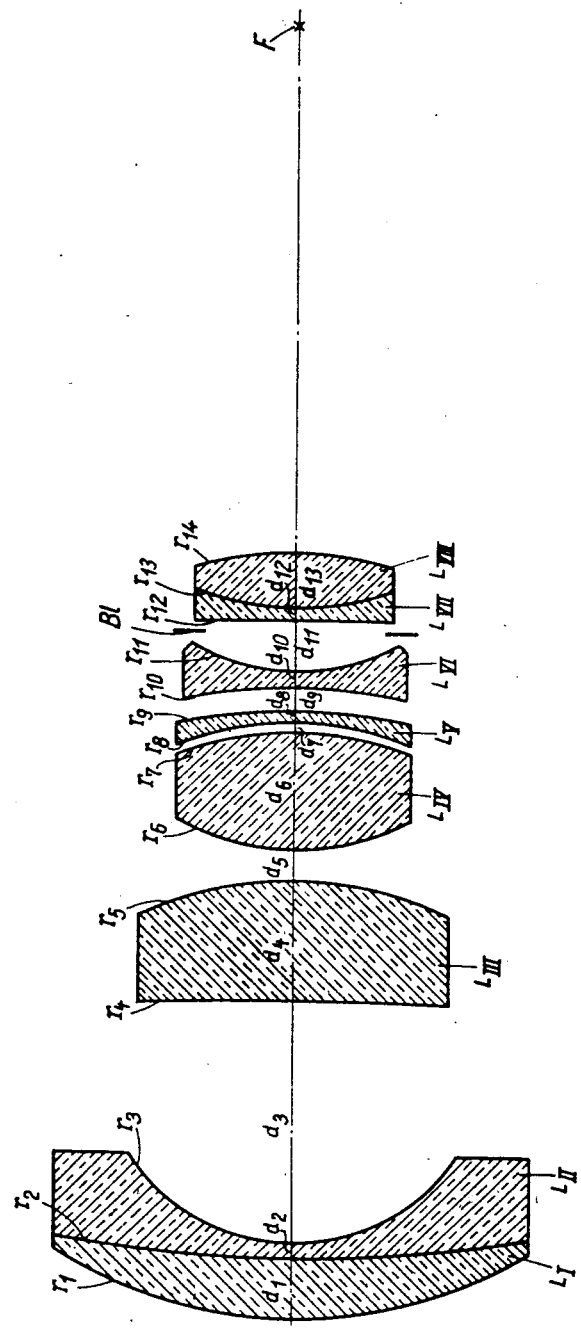

United States Patent Office 2,844,997
Patented July 29, 1958

2,844,997

PHOTOGRAPHIC OBJECTIVE

Günther Lange, Konigsbronn, Wurttemberg, Germany, assignor to Carl Zeiss, Heidenheim (Brenz), Wurttemberg, Germany Application November 26, 1956, Serial No. 624,355

Claims priority, application Germany December 6, 1955

2 Claims. (Cl. 88—57)

The present invention concerns photographic objectives which have a focal intercept of more than 80% of the focal length. Objectives of this kind are used particularly in the so-called single-lens reflex cameras in which room must be found for a tilting mirror between the objective and the film. In my copending patent application Serial No. 527,232, filed August 9, 1955, I have disclosed an interchangeable lens system for photographic purposes which can be put in the place of the front member of a three-component photographic objective (basic objective) consisting of a collective front lens, of a biconcave middle lens and of a collective rear member, producing in this way in conjunction with the two remaining components of the basic objective (middle lens plus rear member) an objective showing an equal focal intercept but a shorter focal length $f$ than the basic objective, which interchangeable lens system is characterized by the following particulars and comprising a front component formed as a cemented dispersive meniscus presenting its convex side to the object, and containing a collective lens made from a glass of high dispersion ($\nu<50$), the axial thickness of this first component lies between the limits $0.06\times f$ and $0.30\times f$, the radius of the anterior external surface of this front component lies between the limits of $0.50\times f$ and $2.00\times f$, the radius of the posterior external surface lies between the limits $0.2\times f$ and $0.8\times f$, an asymmetrical collective member positioned a distance at least $0.20\times f$, but at most $0.70\times f$ from the front member, the more deeply curved surface of said member is on the side further from the object, the radius of said deeply curved surface lies between the limits $-1.20\times f$ and $-0.6\times f$ and is simultaneously numerically smaller than ⅓ of the radius of the other external surface of said member, the axial thickness of said member lies between the limits $0.12\times f$ and $0.48\times f$, and positioned behind the last-mentioned said member, a collective surface convex towards the object with a radius of curvature within the limits $0.35\times f$ and $0.80\times f$ having an apical separation from the last surface of the system of at least $0.15\times f$ but at most $0.5\times f$, the last said surface of the system being a collective surface whose radius lies between the limits $-2.0\times f$ and $-1.0\times f$, and at least one dispersive surface lying between the two last-mentioned collective surfaces.

The objective of the present invention makes use of lenses similar to those included in the interchangeable lens system but is not restricted thereto. For the purpose of constructing wide angle photographic objectives with a focal intercept greater than the focal length of the objective it is proposed according to the invention to arrange at a separation of not less than $0.5\times f$ but at most $10\times f$ in front of the diaphragm at least one meniscus-shaped dispersive component which turns the concave surface towards the diaphragm and a second component in the shape of an asymmetrical collective component with the more deeply curved surface on the side further from the object, the radius of this surface being more than one third of the radius of the front surface of this component, the axial separation between the dispersive front component and the diaphragm being not less than $0.5\times f$ and at most $10\times f$, where $f$ is the focal length of the whole objective, the air space between said dispersive front component and said asymmetrical component being at least $0.20\times f$ and at most $0.70\times f$, and a third component being double convex and following the said second component and having its front surface convex towards the object and with a radius of curvature within the limits $0.35\times f$ and $0.80\times f$, and to provide between this third component and the diaphragm at least one further component shaped such that between them and said third component at least one air space is formed whose two bounding surfaces turn their convex sides towards the diaphragm wherein the radius of either of these two bounding surfaces lies between the limits $-2.5\times f$ and $-0.25\times f$ and the quotient, the radii of these two surfaces bounding said air space lies between the limits 0.5 and 2.0 and wherein the length of this air space lies within the limits of 0.5% and 10.0% of the sum of the absolute values of the radii of its two bounding surfaces and furthermore to arrange a convergent doublet adjoining and following the air space which includes the diaphragm, as the last component of the objective.

By the collective action of a dispersive front meniscus-shaped component with an air space of the said kind provided between this component and the diaphragm it is possible to attain good correction of the coma of oblique pencils.

In the figure of the appended drawing one embodiment according to the invention is represented and in the following table the numerical values for this embodiment are given.

In the figure and in the numerical example there are designated:

By L the individual lenses,
By $r$ the radii
By $d$ the axial separations of the surfaces,
By $n$ the refractive indices and
By $\nu$ the Abbé numbers.

The numerical values refer to a focal length of $f=1$.
The embodiment has an aperture ratio of 1:2.8.

Embodiment
[$f=1.0$]

| Lenses | Radii | Separations | $n$ | $\nu$ |
|---|---|---|---|---|
| $L_I$ | $r_1=+1.01065$ | $d_1=0.13640$ | 1.74000 | 28.2 |
| $L_{II}$ | $r_2=+3.19587$ | $d_2=0.03546$ | 1.74400 | 44.9 |
|  | $r_3=+0.438637$ | $d_3=0.541955$ |  |  |
| $L_{III}$ | $r_4=-10.2530$ | $d_4=0.27230$ | 1.50378 | 66.7 |
|  | $r_5=-0.802773$ | $d_5=0.06820$ |  |  |
| $L_{IV}$ | $r_6=+0.556187$ | $d_6=0.26325$ | 1.50378 | 66.7 |
|  | $r_7=-0.695180$ | $d_7=0.01855$ |  |  |
| $L_V$ | $r_8=-0.675456$ | $d_8=0.02728$ | 1.74400 | 44.9 |
|  | $r_9=-1.28151$ | $d_9=0.05456$ |  |  |
| $L_{VI}$ | $r_{10}=-1.15040$ | $d_{10}=0.03683$ | 1.62536 | 35.6 |
|  | $r_{11}=+0.464608$ | $d_{11}=0.11130$ |  |  |
| $L_{VII}$ | $r_{12}=-13.0947$ | $d_{12}=0.03274$ | 1.54869 | 45.4 |
| $L_{VIII}$ | $r_{13}=+0.576566$ | $d_{13}=0.12276$ | 1.72000 | 50.3 |
|  | $r_{14}=-0.779994$ |  |  |  |

I claim:
1. A photographic objective comprising at least seven lens elements arranged as at least five axially aligned and air spaced components to form a wide angle objective having a long back focal intercept greater than the focal length for use on the so called single-lens reflex camera, and including at least one front meniscus-shaped dispersive component with the convex side towards the object and the concave side towards the diaphragm, the second component being an asymmetrical collective component with the more deeply curved surface on the side further from the object, the radius of this surface being more than one third of the radius of the front surface of this component, the axial separation between the dispersive front component and the diaphragm being not less than $0.5 \times f$ and at most $10 \times f$, lying between the limits of 0.5 and 2.0, and the length of the said air space lying between the limits 0.5% and 10.0% of the sum of the absolute values of the radii of the two surfaces bounding said air space, and the last component of the objective being formed as a convergent doublet adjoining and following the air space which includes the diaphragm.

2. A photographic objective according to claim 1 having the individual refractive powers of the surfaces ($\Delta n/r$) differing by a maximum of $\pm 0.5/f$ and the axial separations of the surfaces ($d$) by a maximum of $\pm 0.2 \times f$ from the numerical values of the following table:

[$f=1.0$]

| Lenses | Radii | Separations | $n$ | $v$ | $\Delta n/r$ |
|---|---|---|---|---|---|
| $L_I$ | $r_1 = + 1.01065 \cdot f$ | | 1.74000 | 28.2 | $+0.732202/f$ |
| | $r_2 = + 3.19587 \cdot f$ | $d_1 = 0.13640 \cdot f$ | | | $+0.001252/f$ |
| $L_{II}$ | | $d_2 = 0.03546 \cdot f$ | 1.74100 | 44.9 | $-1.696163/f$ |
| | $r_3 = + 0.438637 \cdot f$ | $d_3 = 0.541955 \cdot f$ | | | |
| $L_{III}$ | $r_4 = -10.2530 \cdot f$ | | 1.50378 | 66.7 | $-0.049135/f$ |
| | $r_5 = - 0.802773 \cdot f$ | $d_4 = 0.27280 \cdot f$ | | | $+0.627549/f$ |
| | $r_6 = + 0.556187 \cdot f$ | $d_5 = 0.06820 \cdot f$ | | | $+0.905774/f$ |
| $L_{IV}$ | | $d_6 = 0.26325 \cdot f$ | 1.50378 | 66.7 | |
| | $r_7 = - 0.695180 \cdot f$ | $d_7 = 0.01855 \cdot f$ | | | $+0.724675/f$ |
| | $r_8 = - 0.675456 \cdot f$ | | | | $-1.101478/f$ |
| $L_V$ | | $d_8 = 0.02728 \cdot f$ | 1.74400 | 44.9 | |
| | $r_9 = - 1.28151 \cdot f$ | $d_9 = 0.05456 \cdot f$ | | | $+0.580565/f$ |
| | $r_{10} = - 1.15040 \cdot f$ | | | | $-0.543602/f$ |
| $L_{VI}$ | | $d_{10} = 0.03683 \cdot f$ | 1.62536 | 35.6 | |
| | $r_{11} = + 0.464608 \cdot f$ | $d_{11} = 0.11130 \cdot f$ | | | $-1.345994/f$ |
| $L_{VII}$ | $r_{12} = -13.0947 \cdot f$ | | 1.54869 | 45.4 | $-0.041902/f$ |
| | $r_{13} = + 0.576566 \cdot f$ | $d_{12} = 0.03274 \cdot f$ | | | $+0.297121/f$ |
| $L_{VIII}$ | | $d_{13} = 0.12276 \cdot f$ | 1.72000 | 50.3 | |
| | $r_{14} = - 0.779994 \cdot f$ | | | | $+0.923088/f$ | where $f$ is the focal length of the whole objective, the air space between said dispersive front component and said asymmetrical component being at least $0.20 \times f$ and at most $0.70 \times f$, the third component being double convex and following the said second component and having its front surface convex towards the object and with a radius of curvature within the limits $0.35 \times f$ and $0.80 \times f$ and between said third component and the diaphragm at least one further component shaped such that between them and said third component at least one air space is formed whose bounding surfaces turn their convex sides towards the said diaphragm, the radius of each said bounding surfaces lying between the limits of $-2.5 \times f$ and $-0.25 \times f$, and the quotient of the radii of the two surfaces bounding said air space $L_I \ldots L_{VIII}$ being the individual lens elements,
$r_1 \ldots r_{14}$ being the radii of the lens surfaces,
$d_1 \ldots d_{13}$ being the axial separations,
$n$ being the refractive indices and
$v$ being the Abbé numbers.

References Cited in the file of this patent

UNITED STATES PATENTS

| | | |
|---|---|---|
| 1,955,590 | Lee | Apr. 17, 1934 |
| 2,317,790 | Mellor | Apr. 27, 1943 |
| 2,341,385 | Kingslake | Feb. 8, 1944 |
| 2,594,021 | Hopkins et al. | Apr. 22, 1952 |
| 2,649,022 | Angenieux | Aug. 18, 1953 |
| 2,696,758 | Angenieux | Dec. 14, 1954 |